US009832196B2

(12) United States Patent
Sharma et al.

(10) Patent No.: US 9,832,196 B2
(45) Date of Patent: Nov. 28, 2017

(54) NETWORK MONITORING DEVICE (71) Applicant: Bank of America Corporation, Charlotte, NC (US)

(72) Inventors: Pratibha Sharma, Gurgaon (IN); Tusnin Das, Hyderabad (IN); Kedarnath Shukla, Mumbai (IN); Sarmistha Muduly, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 530 days.

(21) Appl. No.: 14/486,208

(22) Filed: Sep. 15, 2014

(65) Prior Publication Data
US 2016/0080231 A1    Mar. 17, 2016

(51) Int. Cl.
*H04L 29/06* (2006.01)

(52) U.S. Cl.
CPC .......... *H04L 63/10* (2013.01); *H04L 63/1408* (2013.01)

(58) Field of Classification Search
CPC ................. H04L 63/10; H04L 63/0236; G06F 17/30867; G06F 17/308867
USPC ........................................................ 709/224
See application file for complete search history.

(56) References Cited

U.S. PATENT DOCUMENTS

| | | | |
|---|---|---|---|
| 6,128,298 A | 10/2000 | Wootton et al. | |
| 7,093,012 B2 * | 8/2006 | Olstad | G06F 17/30864 707/E17.108 |
| 7,194,464 B2 * | 3/2007 | Kester | G06F 17/30864 |
| 7,895,202 B2 | 2/2011 | Silman | |
| 8,010,552 B2 | 8/2011 | Kester et al. | |
| 8,527,504 B1 | 9/2013 | Krishnamurthy | |
| 8,537,831 B2 | 9/2013 | Ortacdag et al. | |
| 8,543,725 B1 | 9/2013 | Nemavat et al. | |
| 8,555,368 B2 | 10/2013 | Waskiewicz et al. | |
| 8,566,406 B2 | 10/2013 | Carvalho Neto et al. | |
| 8,713,199 B2 | 4/2014 | Bronnenberg et al. | |
| 8,751,514 B2 | 6/2014 | Kester et al. | |
| 8,775,508 B2 | 7/2014 | Rose | |
| 8,935,457 B2 | 1/2015 | Feng et al. | |
| 8,990,901 B2 | 3/2015 | Aravindakshan et al. | |
| 8,996,691 B1 | 3/2015 | Stickle et al. | |
| 8,997,201 B2 | 3/2015 | Wotring | |
| 9,003,010 B1 | 4/2015 | Saparoff | |
| 2006/0064469 A1 * | 3/2006 | Balasubrahmaniyan | H04L 63/029 709/218 |
| 2007/0271390 A1 * | 11/2007 | Landau | G06F 17/30887 709/238 |
| 2008/0133540 A1 * | 6/2008 | Hubbard | H04L 63/101 |
| 2010/0058204 A1 * | 3/2010 | Wilson | G06F 17/30867 715/760 |

(Continued)

*Primary Examiner* — Patrice Winder
*Assistant Examiner* — Aye M Aung
(74) *Attorney, Agent, or Firm* — Banner & Witcoff, Ltd.; Michael A. Springs (57) ABSTRACT

A network monitoring device for improved filtering of access, from a secure internal network, to an unsecured network is provided. The network monitoring device may identify keywords associated with network addresses to which access should not be granted to users of a secure network internal to a business enterprise. In turn, the network monitoring device may attempt to access URLs associated with the identified keywords, and if access is granted, execute processes to update access permissions to unsecured network locations.

20 Claims, 7 Drawing Sheets

(56) References Cited

U.S. PATENT DOCUMENTS

| | | | |
|---|---|---|---|
| 2012/0072232 A1* | 3/2012 | Frankham | G06Q 50/22 705/2 |
| 2013/0091129 A1* | 4/2013 | Kim | G06F 17/30699 707/723 |
| 2013/0339337 A1* | 12/2013 | Alkhateeb | G06F 17/30864 707/710 |
| 2015/0200820 A1* | 7/2015 | Moore | H04L 43/04 709/224 |

* cited by examiner

| url_a 330 | Keyword_a1 332<br>Keyword_a2 334 | Timestamp 336 | Ranking 338 | Flag 340 |
|---|---|---|---|---|
| url_b 342 | . . . | . . . | . . . | . . . |
| . . . | | | | |

NETWORK MONITORING DEVICE

TECHNICAL FIELD

Aspects of this disclosure generally relate to systems and methods for improving accuracy of content filtering processes associated with a network.

BACKGROUND

Business enterprises may utilize filtering processes to ensure that data that is accessible on an internal network is stored and maintained in a secure manner. In one example, a business enterprise may store personal and/or commercial information associated with one or more clients. Accordingly, the business enterprise may execute one or more processes to ensure that this confidential information may not be communicated, inadvertently or otherwise, outside of one or more secure, internal networks. Specifically, the business enterprise may utilize network filtering software to prevent internal users, or employees, from gaining access to external network locations that may not be sufficiently secure.

In one specific example, a business enterprise may utilize a third-party website filtering device to monitor requests. As such, a monitored request may be an attempt to access to one or more external websites (external to the business enterprise, e.g., on the World Wide Web), and made by users of a network internal to the business enterprise. In turn, the third-party website filtering device may identify, and prevent access to, one or more websites to which access may not be granted, based upon one or more features of said websites. These features may include, among others, means for communicating information out from a secure network that is internal to a business enterprise. For example, a third-party website filtering device may identify, and block access to, a website facilitating access to email accounts that are not associated with the business enterprise in question.

A third-party website filtering device vendor may be requested to maintain and update a database of external network locations (websites, and the like) to which access may not be granted to users of one or more internal networks of a business enterprise. However, given the volume, and ever-changing nature of websites accessible via the Internet, there may exist various external network locations to which users may gain access, in spite of noncompliance of these network locations with one or more accessibility rules mandated by the business enterprise. These insecure, but accessible, external network locations may represent a significant potential security risk to a business enterprise, and as such, a need exists for an improved network monitoring device.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure relates to a website filtering apparatus having a processor in communication with a non-transitory computer-readable medium with computer-executable instructions that receives one or more keyword strings from a filtering database. The computer-executable instructions further communicate, iteratively, the keyword strings to an Internet scraper device, and receive, from the Internet scraper device, uniform resource locators (URLs) associated with the keyword strings. Additionally, the computer-executable instructions add the received URLs to the filtering database, and iteratively attempt to access the URLs using a browser. Accordingly, if access is granted to a selected one of the identified URLs, a first flag value is associated with the selected URL, and if access is denied to the selected URL, a second flag value is associated with the selected URL. Further, the computer-executable instructions generate an output data set that associates the identified URLs with a determined flag value.

In another aspect, this disclosure includes a computer-implemented method that receives a plurality of keywords from a filtering database, iteratively communicates the keywords to an Internet scraper device, and receives URLs from the scraper device based upon searches performed using the keyword strings. Additionally, the computer-implemented method adds the identified URLs to a filtering database, and iteratively attempts to access the URLs using a browser. Further, the computer-implemented method associates a first flag value with URLs accessible via the browser, and a second flag value with URLs inaccessible via the browser. Additionally, the computer-implement a method generates an output data set indicating an association between each of the identified URLs and a flag value.

In yet another aspect, this disclosure relates to one or more non-transitory computer-readable media having instructions that, when executed, receive a plurality of keywords from a filtering database, and iteratively communicate the keywords to an Internet scraper device. Additionally, the instructions, when executed, receive one or more URLs associated with a selected keyword, and add the one or more URLs to the filtering database. Subsequently, the instructions iterate through the URLs, attempting to access content associated with the URLs using a browser device. In response, if access is available using the browser device, a first flag value is associated with a selected URL. Alternatively, if access is not available using the browser device, a second flag value is associated with the selected URL. Additionally, the instructions, when executed, generate an output data set that associates the URLs with a first flag value or a second flag value.

Aspects of this disclosure address one or more of the issues mentioned above by disclosing methods, systems, non-transitory computer readable media, and apparatuses for network monitoring. Aspects of the disclosure may also be provided in a non-transitory computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements.

DETAILED DESCRIPTION

A third-party network filtering device may be utilized to prevent access to one or more external network locations from a secure internal network. In one example, a third-party network filtering device may monitor network traffic from a secure internal network (intranet) requesting access to one or more websites on the Internet. Further, the third-party network filtering device may store and maintain a database of websites and other network locations to which access should not be granted to users of one or more secure internal networks associated with a business enterprise, such as a financial institution. This database may identify websites and network locations to which access should not be granted, based upon one or more access rules set forth by the business enterprise. These access rules may include, among many others, identification of external email clients, cloud-based storage services, or other services configured to allow information to be communicated from an internal network to an external network or device. Additionally, the access rules may identify websites, or other external sources, from which there is a potential to receive malware (spyware, and the like). However, in some instances, and due to the extensive, and variable nature of the Internet, this database of websites to which access should not be granted may be incomplete. As such, a user of a secure internal network within, in one example, a financial institution, may be able to request, and gain access to, a potentially insecure website.

Advantageously, the systems and methods described herein relate to a network monitoring device for improved analysis and filtering of content accessible from a secure internal network associated with a business enterprise. In particular, the described network monitoring device may be utilized by a financial institution, but those of ordinary skill in the art will recognize that the network monitoring device may generally be utilized by any business enterprise type, without departing from the scope of the disclosures described herein. In this way, the systems and methods described herein may be utilized to identify network locations, websites, and/or web content, in addition to those websites identified and blocked by a third-party network filtering device. In particular, the network monitoring device described herein may utilize a database of predetermined keywords associated with websites to be searched and filtered. Additionally, the network monitoring device may be utilized to infer and store new keywords associated with potentially insecure websites.

Figure 1:
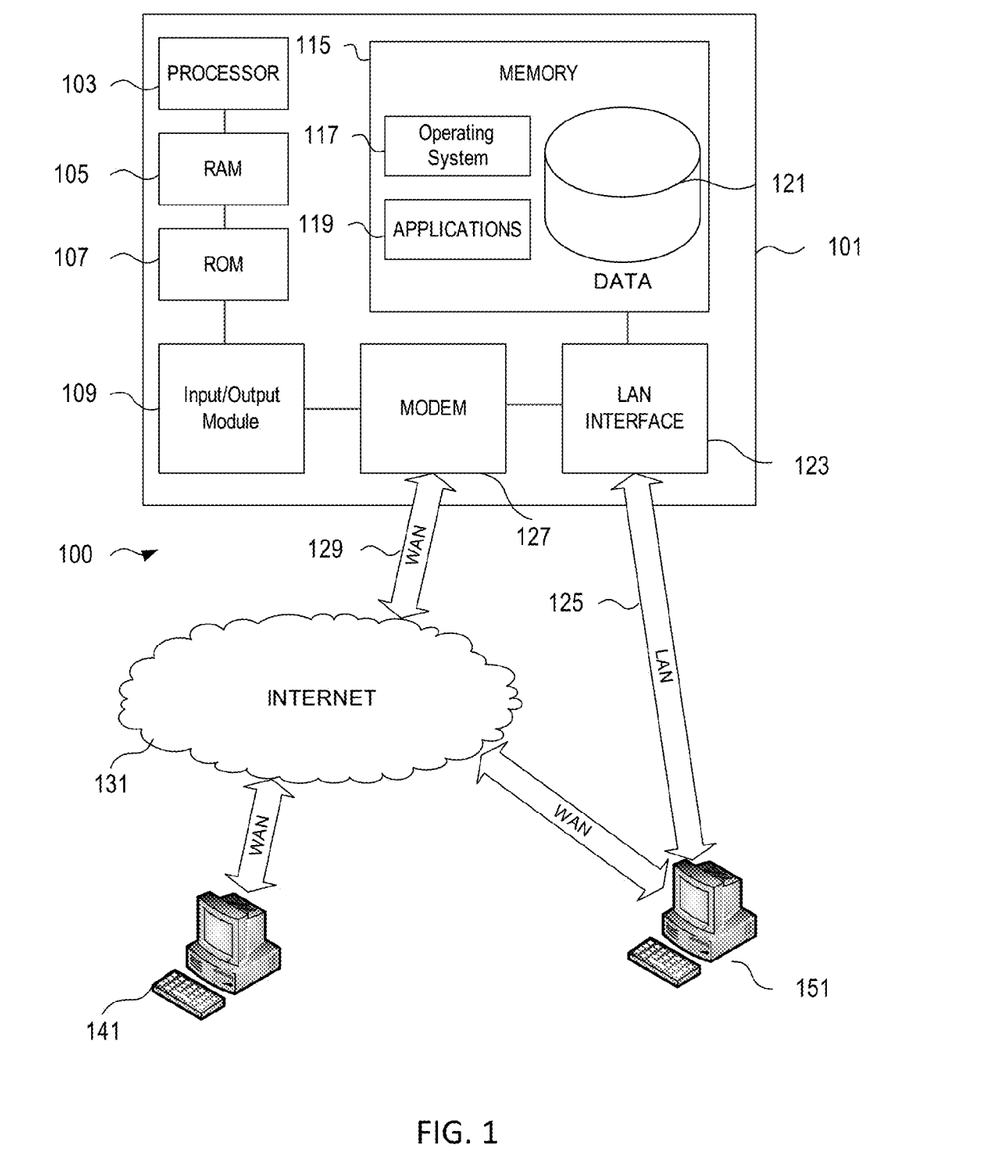
FIG. 1 shows an illustrative operating environment in which various aspects of the disclosure may be implemented.

Accordingly, and with reference to FIG. 1, the network monitoring device may be implemented as a specialized computing system 100. As such, the network monitoring device 100 may include one or more network-linked computer devices, such as devices 101, 141, and/or 151. Furthermore, the network monitoring device 100 may be implemented on consolidated computing hardware, such as computing device 101, at a single geographic location, and/or on a single integrated circuit, and the like. In another example, the network monitoring device 100 may be implemented across multiple computing devices at a common geographic location, or at dispersed geographic locations. As such, device 100 may comprise computing devices 101, 141, and/or 151 in communication with one another using one or more networking technologies (125, 129, and/or 131) described in further detail in the description that follows.

In one example implementation, computing device 101 may have a processor 103 for controlling overall operation of device 101 and its associated components, including RAM 105, ROM 107, an input/output (I/O) module 109, and memory 115. In one example, as will be apparent to those of ordinary skill in the art, memory 115 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 115 may comprise a non-transitory computer-readable medium that may communicate instructions to processor 103 to be executed.

I/O module 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to the processor 103 for allowing the computing device 101 to perform various functions. For example, memory 115 may store software used by the computing device 101, such as an operating system 117, application programs 119, and an associated database 121. The processor 103 and its associated components may allow the computing device 101 to run a series of computer-readable instructions to process and format data.

The computing device 101 may operate in a networked environment supporting connections to one or more remote computers, such as computing devices 141 and 151. In one example, the computing devices 141 and 151 may be personal computers or servers that include many, or all, of the elements described above relative to the computing device 101. Alternatively, computing device 141 and/or 151 may be a data store that is affected by the operation of the computing device 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative, and other means of establishing a communication link between the computers may be used. The existence of any of various well-known protocols such as TCP/IP, Ethernet, FTP, HTTP and the like is presumed. Accordingly, communication between one or more of computing devices 101, 141, and/or 151 may be wired or wireless, and may utilize Wi-Fi, a cellular network, Bluetooth, infrared communication, or an Ethernet cable, among many others.

Additionally, an application program 119, used by the computing device 101 according to an illustrative embodiment of the disclosure, may include computer-executable instructions for invoking functionality related to network monitoring.

The computing device 101 and/or the other devices 141 or 151 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
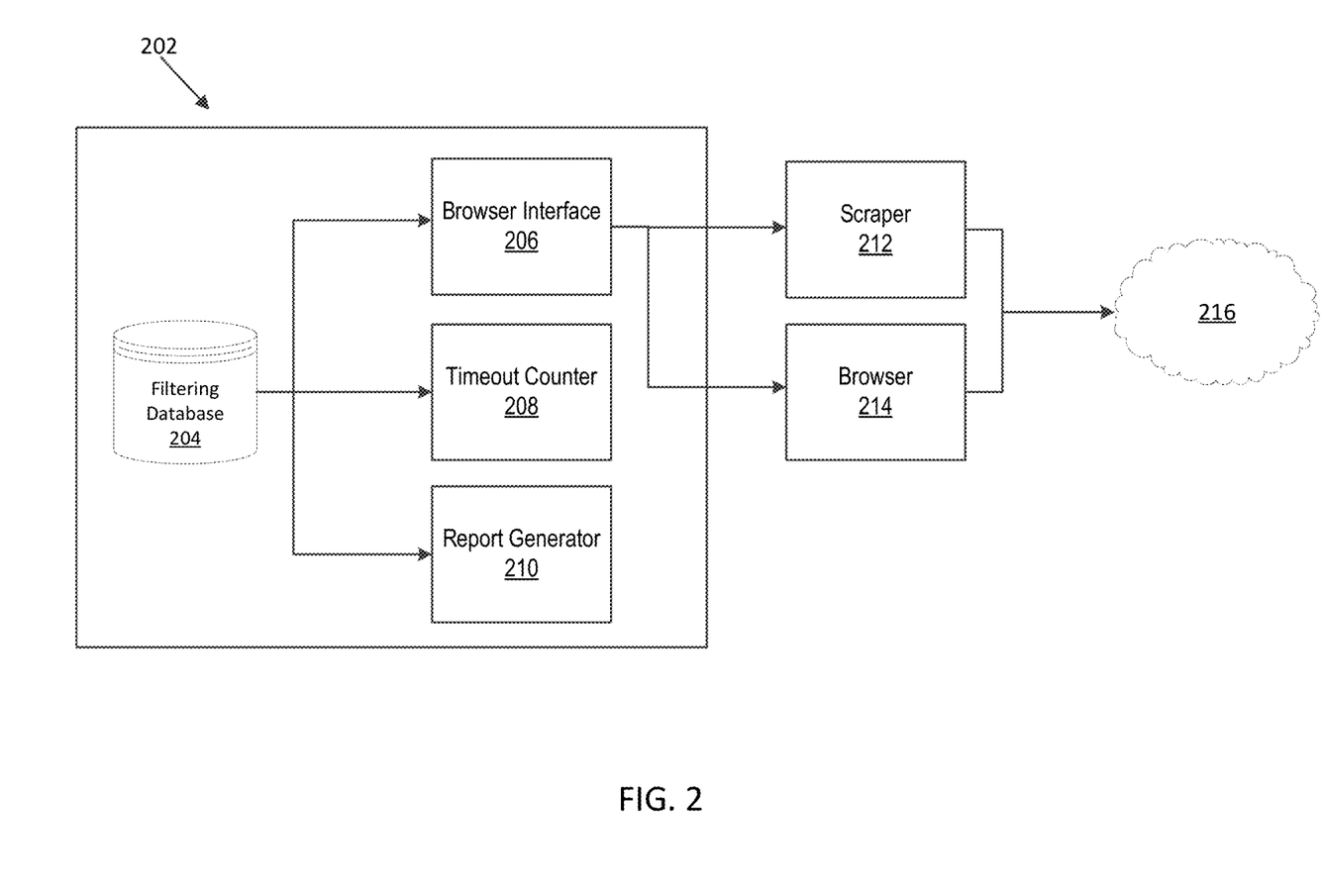
FIG. 2 depicts an illustrative network monitoring device, according to one or more aspects described herein.

FIG. 2 is a schematic block diagram of a network monitoring device 202. In particular, network monitoring device 202 includes a filtering database 204, a browser interface device 206, a timeout counter device 208, and a report generator device 210. Further, the network monitoring device 202 may interface with a scraper device 212 and/or a browser device 214, and further, with a network 216.

In particular, filtering database 204 may store information associated with one or more keywords, and/or one or more previously-identified uniform resource locators (URLs). In one example, the filtering database 204 may be a form of persistent or volatile memory implemented using one or more of a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Furthermore, those of ordinary skill in the art will recognize that filtering database 204 may utilize any file system or filing methodology for storing payload information and metadata, among others.

Figure 3A:
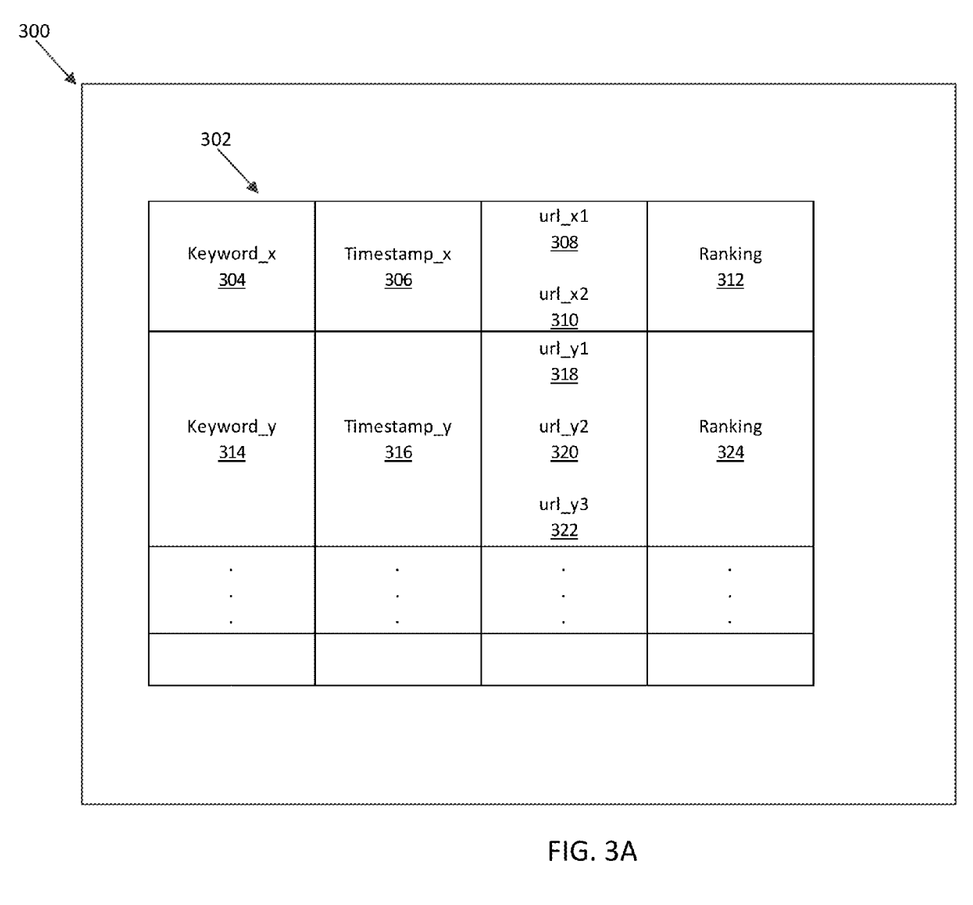
FIGS. 3A and 3B are illustrative filtering databases, according to one or more aspects described herein.

In one implementation, filtering database 204 may store a plurality of keywords that may be indicative of websites to which access will not be granted from secure internal networks associated with a business enterprise. Additionally or alternatively, the filtering database 204 may store a plurality of URLs associated with websites to which access will not be granted from secure internal networks. Accordingly, further details of the filtering database 204 are described in relation to FIGS. 3A and 3B. In particular, FIG. 3A schematically depicts a filtering database 300, which may be similar to filtering database 204 from FIG. 2. The filtering database 300 may have a keyword lookup table 302.

As such, those of ordinary skill in the art will recognize that while one exemplary implementation of a keyword lookup table 302 is presented in FIG. 3A, table 302 is merely one schematic representation of a keyword lookup table, and various additional or alternative implementations may be envisioned, without departing from the scope of the disclosures described herein. Accordingly, keyword lookup table 302 may store a keyword 304 in association with a time stamp 306, URLs 308 and 310, and a ranking 312. Additionally, table 302 may store a keyword 314 in association with a time stamp 316, URLs 318, 320, 322, and a ranking 324, among others. In one example, keywords 304 and 314 may be strings of ASCII characters representing one or more words, numbers, or other identifiers that represent one or more elements that may be associated with network locations and/or Web addresses to which access may not be granted.

In one implementation, timestamp 306 may store a time and date that the keyword 304 was last searched for using the browser interface device 206, as described in further detail in relation to FIG. 2. Furthermore, URLs 308 and 310 may be stored in association with keyword 304 as a result of one or more processes executed by browser interface device 206. Accordingly, URLs 308 and 310 may represent network addresses to which access will be blocked from one or more secure internal networks to a business enterprise, and based upon an association between the URLs 308 and 310, and keyword 304. Similarly, URLs 318-322 may also be blocked based upon an association with keyword 314.

In one example, a ranking 312 may be stored in association with keyword 304. Accordingly, ranking 312 may represent a relative importance of keyword 304. As such, ranking 312 may determine the frequency with which a first keyword 304 is searched using browser interface device 206. In one specific example, ranking 312 may have a first numerical value, and ranking 324, associated with a second keyword 314, may have a second numerical value. Accordingly, a keyword, from exemplary keywords 304 and 314, associated with a higher ranking value, from rankings 312 and 324, will be searched with greater frequency using browser interface device 206.

Figure 3B:
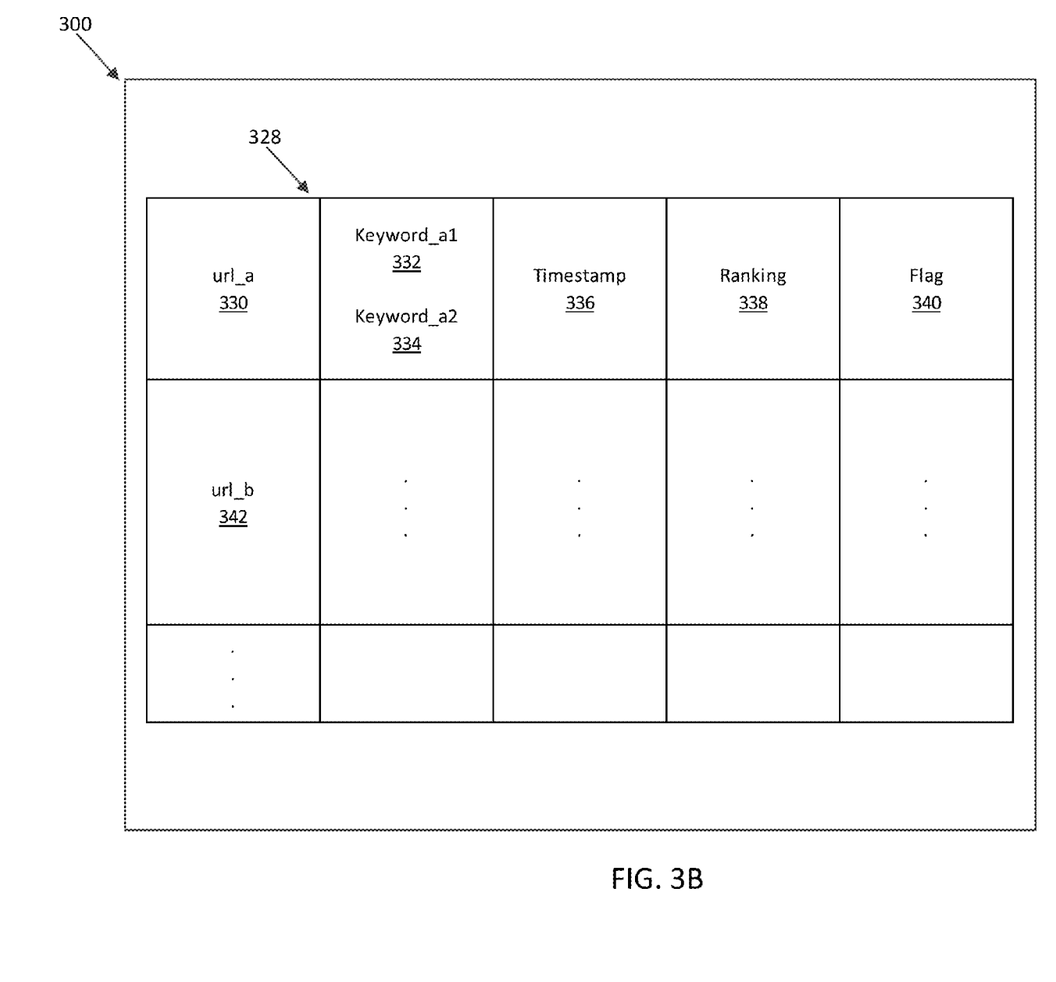

In one implementation, and as described in relation to FIG. 3B, filtering database 300 may additionally or alternatively store a URL lookup table 328. In a similar manner to keyword lookup table 302, URL lookup table 328 is depicted in FIG. 3B with an exemplary data structure, and those of ordinary skill in the art will recognize that lookup table 328 may be embodied with any lookup table structure known to those of ordinary skill in the art, without departing from the scope of the disclosures described herein. In particular, lookup table 308 may store a plurality of URLs, such as those depicted URLs 330, and 342. Further, keywords 332 and 334, timestamp 336, ranking 338, and flag value 340, may, in one example, be associated with URL 330. As such, URLs 330 and 342 may represent Web addresses to which access may not be granted from one or more secure internal networks associated with a business enterprise. In one example, URLs 330 and 342 may be identified by browser interface device 206. In one specific example, browser interface device 206 may identify URL 330 based upon the use of keywords 332 and 334 in the content associated with URL 330. Further, timestamp 336 may store a time and date that URL 330 was last searched/queried by browser interface device 206. In one example, ranking 338 may be a numerical value representing a relative importance of URL 330 (relative to one or more additional URLs stored in lookup table 328). As such, ranking 338 may represent a frequency with which browser interface device 206 queries the URL 330 to determine whether a third-party website filter device is allowing access to said URL 330. Additionally, ranking 338 may represent a perceived potential security risk associated with URL 330. Further, flag 340 may be a numerical value, or other data point, associated with URL 330, and representing whether a third-party website filter device is allowing access to URL 330 as of that date and time associated with timestamp 336.

Turning again to FIG. 2, browser interface device 206 may execute one or more processes to, among others, receive one or more keywords from filtering database 204. In response, browser interface device 206 may execute one or more processes to search for network locations, network addresses, or website addresses associated with the one or more received keywords. Additionally or alternatively, the browser interface device 206 may receive one or more URLs, from filtering database 204. Similarly, the browser interface device 206 may execute one or more processes to attempt to access the received one or more URLs.

In one example implementation, browser interface device 206 may execute one or more processes implemented using a scripting language. For example, browser interface device 206 may be configured to process a JavaScript program. Those of ordinary skill in the art will recognize, however, that browser interface device 206 may be utilized with additional or alternative programming/scripting languages, including, among others, Perl, Python, or UNIX shell scripts. In one specific example, browser interface device 206 may be an extension to a web browser, and may facilitate installation and running of scripts. As such, browser interface device 206 may communicate with browser device 214. In turn, and in one example, browser device 214 may execute one or more processes to implement a web browser application.

In one implementation, browser interface device 206 may execute one or more processes to iteratively communicate a plurality of keyword terms to a scraper device 212. As such, the scraper device 212 may be configured to identify one or more occurrences of the plurality of keyword terms on a network 216. In one specific example, the scraper device 212 may be a web search engine, and network 216 may be the Internet. In one implementation, scraper device 212 may return one or more search results to browser interface device 206, wherein said search results may include one or more URLs associated with the plurality of keyword terms iteratively communicated from the browser interface device 206 to the scraper device 212. Upon receipt of the one or more URLs associated with the plurality of keyword terms, browser interface device 206 may communicate with browser device 214 to attempt to access, iteratively, the one or more URLs. As such, if browser device 214 allows access to browser interface device 206 to a selected URL, from the one or more URLs associated with the plurality of keyword terms, browser interface device 206 flags the selected URL for communication to a third-party that provides and maintains a website filtering device on the half of the business enterprise.

In one implementation, browser interface device 206 may communicate with scraper device 212 to search a network 216, such as the Internet, for an identified keyword term. In response, the browser interface device 206 may receive, from scraper device 212, one or more URLs associated with the identified keyword term. Accordingly, the browser interface device 206 may store the received one or more URLs in association with the identified keyword term in the filtering database 204, as described in further detail in relation to FIGS. 3A and 3B. Additionally or alternatively, browser interface device 206, in response to communicating a selected keyword term to the scraper device 212, may receive one or more additional keyword terms from the scraper device 212. For example, the browser interface device 206 may receive one or more additional keyword terms that were received in conjunction with the selected keyword term on one or more websites. In turn, the browser interface device 206 may store the one or more additional keyword terms in association with the selected keyword term in the filtering database 204.

As previously described, browser interface device 206 may identify one or more URLs to which network access may not be granted from within a secure internal network associated with a business enterprise. As such, browser interface device 206 may execute one or more processes to attempt to access the one or more identified URLs. In response, access may be granted or denied based upon access settings associated with a third-party website filter device. The browser interface device 206 may record a timestamp, such as timestamp 336, corresponding to a time and date on which an attempt was made to access an identified URL. Additionally, browser interface device 206 may execute one or more processes to associate a timeout counter with an identified URL. As such, a timeout counter may be utilized to determine when the browser interface device 206 is to make a subsequent attempt to access the identified URL. For example, upon attempting to gain access to the identified URL, the browser interface device 206 may communicate with timeout counter device 208 to execute a timeout counter to be associated with the identified URL. Those of ordinary skill in the art will recognize that such a timeout counter may be a countdown timer, or may measure the time elapsed since a timestamp, among others. In one implementation, upon lapsing of the timeout counter associated with an identified URL, the timeout counter device 208 may instruct the browser interface device 206 to query the identified URL to determine whether the URL is newly accessible, or inaccessible. In another implementation, the browser interface device 206 may periodically query the timeout counter device 208 to determine whether one or more timer counters associated with one or more identified URLs have elapsed. Accordingly, timeout counter device 208 may execute a plurality of timers associated with part, or all, of those URLs stored in filtering database 204.

In one example, report generator device 210 may execute one or more processes to identify one or more URLs, stored in filtering database 204, to which browser interface device 206 was granted access through browser device 214. Accordingly, these one or more URLs may represent potential security vulnerabilities, and may be accessible from an internal network associated with a business enterprise. As such, report generator device 210 may execute one or more processes to inform a third-party website filter of the one or more URLs, instructing the third-party website filter to add the identified URLs to a list of inaccessible network locations.

Figure 4:
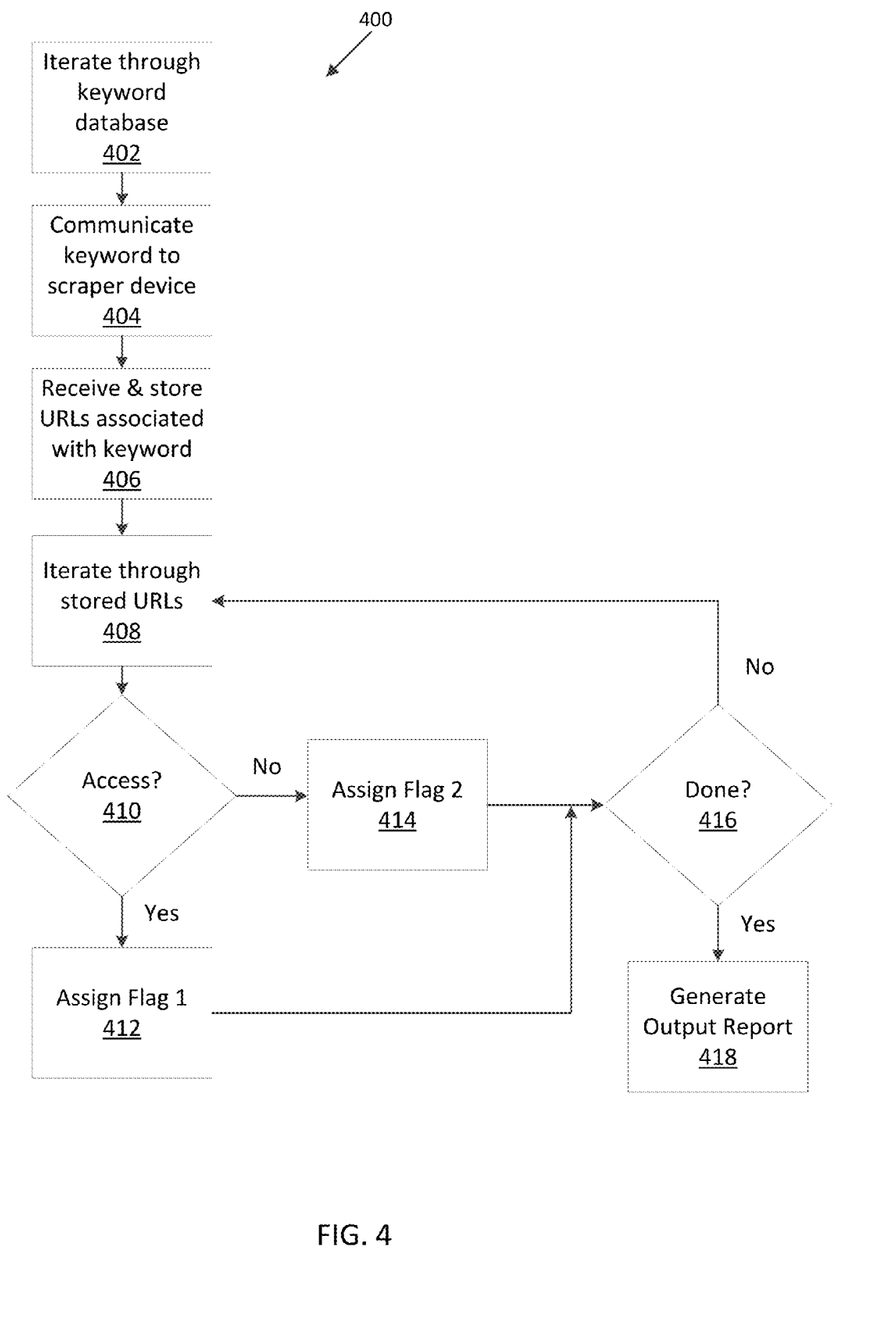
FIG. 4 is an illustrative flowchart diagram of a filtering process, according to one or more aspects described herein.

FIG. 4 is a flowchart diagram of a filtering process 400. In one example, process 400 may be executed by the browser interface device 206. In one implementation, process 400 may iterate through a keyword database, such as keyword lookup table 302 stored in filtering database 300, as described in relation to FIG. 3A. As such, in one example, this iteration may be carried out at block 402 of process 400. Accordingly, process 400, at block 404, may communicate a selected keyword to a scraper device, such as device 212 described in relation to FIG. 2. In response, the scraper device 212 may execute one or more processes to retrieve one or more URLs that contain the selected keyword, variations of the selected keyword, or related search terms. As such, and at block 406 of process 400, the browser interface device 206 may receive the one or more URLs identified by the scraper device 212, and subsequently store these one or more URLs in the filtering database 204.

In one example, and at block 408 of process 400, the browser interface device 206 may iterate through one or more URLs stored in a filtering database, such as filtering database 204. As such, the browser interface device 206, at decision block 410, may iteratively attempt to access, via a browser device 214, the one or more stored URLs. If access is granted to a selected URL, from the one or more stored URLs, process 400 proceeds to block 412, and the browser interface device 206 assigns a first flag value to the selected URL. In one example, this flag value may be similar to flag 340 from FIG. 3B. If, however, access is not granted to the selected URL, process 400 proceeds to block 414, and the browser interface device 204 assigns a second flag value to the selected URL. Additionally or alternatively, browser interface device 206 may, at decision block 410, attempt to access a selected URL using one or more modifications of said URL. For example, browser interface device 206 may, at decision block 410, modify a selected URL and re-attempt to access the modified URL. In one specific example, a URL protocol, or scheme, may be modified, and a further attempt made to access the modified URL. This may, in one example, include changing a "https://" to a "http://" protocol, among others. Decision block 416 may represent one or more processes executed by the browser interface device 216 to determine whether all of the stored URLs have been tested (whether access has been requested via browser device 214). Accordingly, if iteration through the database of stored URLs is not complete, process 400 proceeds back to block 408. In turn, and upon completion of iteration through the stored URLs, process 400 may proceed to block 418, and the report generator device 210 may execute one or more processes to generate an output report indicative of one or more of the stored URLs to which access has been granted and/or has been denied. In one example, the output report generated at block 418 may be communicated to a third-party, such that one or more access rules associated with a third-party website filter may be updated.

Figure 5:
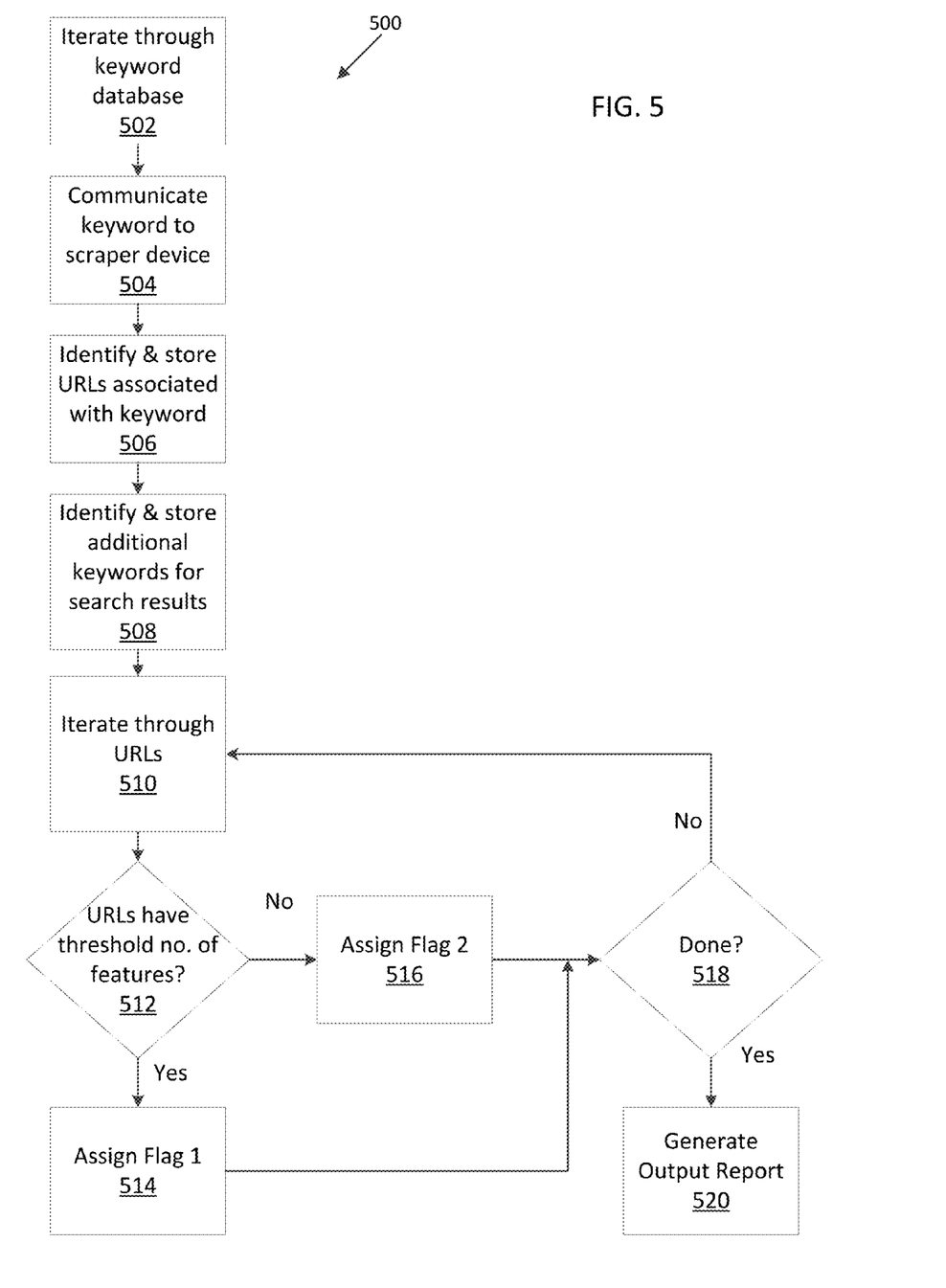
FIG. 5 is an illustrative flowchart diagram of another filtering process, according to one or more aspects described herein.

FIG. 5 is a flowchart diagram of another filtering process 500. In one example, a browser interface device, such as browser interface device 206, may execute one or more processes to iterate through a keyword database, such as keyword lookup table 302 associated with filtering database 300. In one implementation, this iterative search through a keyword database may be carried out at block 502 of process 500. Accordingly, and at block 504, the browser interface device 206 may communicate a selected keyword to a scraper device, such as scraper device 212. In response, the scraper device 212 may search for one or more URLs associated with the received keyword. As such, block 506 of process 500 may represent one or more processes executed by the browser interface device 206 to identify one or more URLs associated with the selected keyword, and using the received search results from the scraper device 212.

Block 508 of process 500 may represent one or more processes executed by the browser interface device 206 to identify additional keywords from search results received from the scraper device 212. In this way, the browser interface device 206 may temporarily store a recognized term (string, value, among others) associated with a searched keyword, and upon recurrence of the temporarily-stored term a threshold number of times, add the term to a keyword database, such as keyword lookup table 302 from FIG. 3A. In one example, a new keyword may be identified based upon one occurrence of a term in response to a search for an existing keyword. In another example, however, a new keyword may be identified based upon a threshold number of occurrences of a term in response to a search of an existing keyword. Those of ordinary skill in the art will recognize that this threshold number may be any value. Additionally or alternatively, a new keyword may be identified based upon use of the term in association with an existing keyword in search results from the scraper device 212, but excluding commonly-used language (excluding commonly-used terms, such as, "the," "a," or "that," among many others).

In one example, and at block 510 of process 500, the browser interface device 206 may iterate through one or more URLs stored in a filtering database, such as filtering database 204. As such, the browser interface device 206, at decision block 512, may iteratively attempt to access, via a browser device 214, the one or more stored URLs, and determine whether a selected URL, from the one or more stored URLs, may be associated with a threshold number of features. In one example, these features may include text input fields, instances of additional keywords, website security certificates, password protection limits based on a geographic location or an IP address attempting to access the URL, among others. Accordingly, if a selected URL, from the one or more stored URLs, has a threshold number of features, process 500 may proceed to block 514, and the browser interface device 206 may assign a first flag value to the selected URL. In one example, this flag value may be similar to flag 340 from FIG. 3B. If, however, a selected URL is not associated with a threshold number of features, process 500 may proceed to block 516, and the browser interface device 204 may assign a second flag value to the selected URL. Decision block 518 may represent one or more processes executed by the browser interface device 216 to determine whether all of the stored URLs have been tested (whether access has been requested via browser device 214). Accordingly, if iteration through the database of stored URLs is not complete, process 500 may proceed back to block 510. In turn, and upon completion of iteration through the stored URLs, process 500 may proceed to block 520, and the report generator device 210 may execute one or more processes to generate an output report indicative of one or more of the stored URLs to which access has been granted and for which a threshold number of features were identified. In one example, the output report generated at block 520 may be communicated to a third-party, and such that one or more access rules associated with a third-party website filter may be updated.

Figure 6:
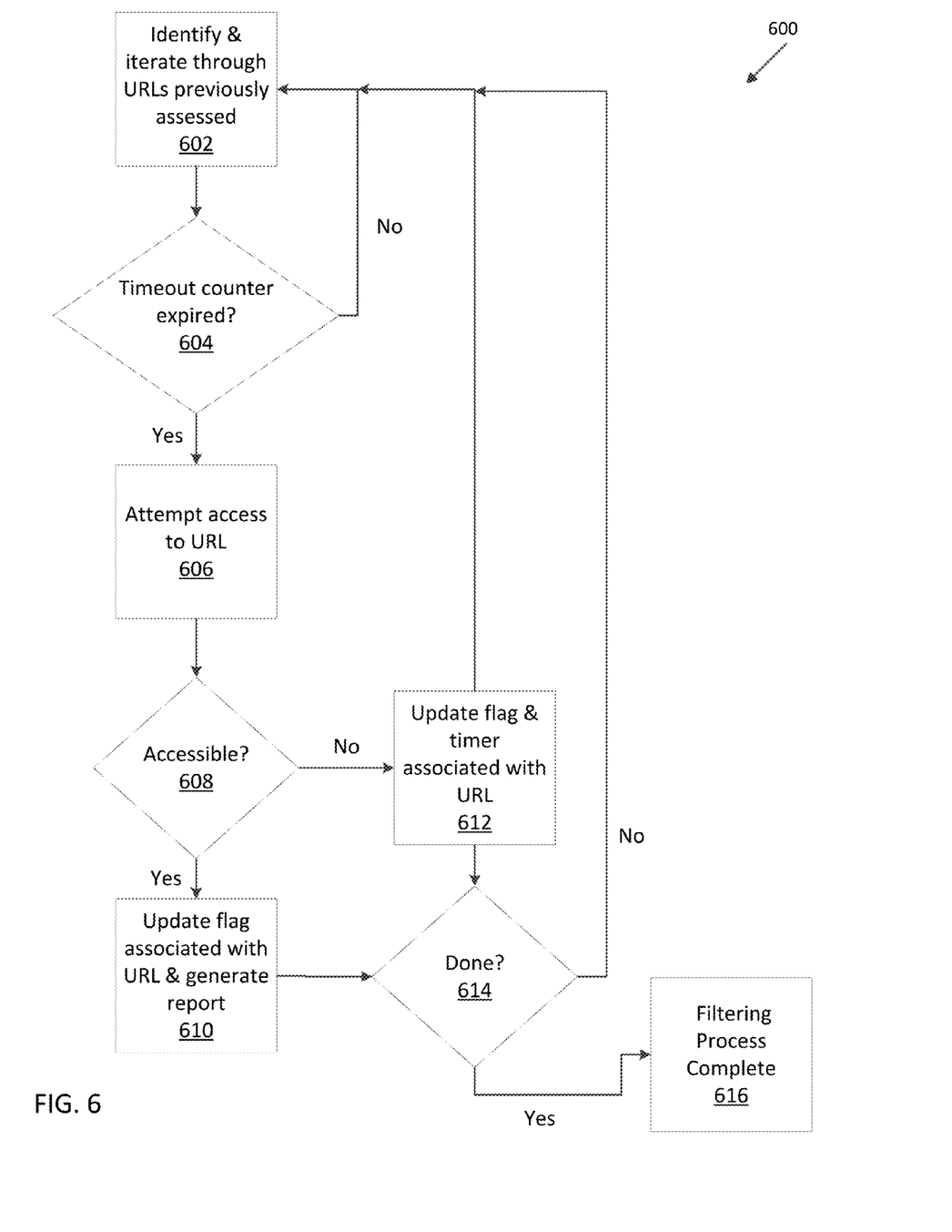
FIG. 6 is an illustrative flowchart diagram of a yet another filtering process, according to one or more aspects described herein.

FIG. 6 is a flowchart diagram of another filtering process 600. In particular, process 600 may be executed by a network monitoring device 202 to reassess one or more URLs previously identified as being in violation of one or more access rules. Block 602 may represent one or more sub-processes executed by a browser interface device 206 to identify and iterate through one or more URLs previously assessed. In this way, the browser interface device 206 may iterate through one or more URLs stored in a filtering database 204. In one example, at decision block 604, the browser interface device 206 may iteratively query a timeout counter device 208 to determine whether a timer/timeout counter/threshold time limit associated with a selected URL has elapsed/expired. If an associated timer counter is not expired, process 600 proceeds to block 602. If, however, a timeout counter has expired, process 600 proceeds to block 606, and the browser interface device 206 executes one or more sub-processes to attempt to access the identified URL once again.

If, at decision block 608, the browser interface device is unsuccessful in accessing the selected URL, process 600 proceeds to block 612, and the browser interface device 206 updates a flag, such as flag value 340, and/or a timestamp, such as timestamp 336, associated with the selected URL, such as URL 330. Similarly, if the browser interface device is granted access to the selected URL, process 600 proceeds to block 610. As such the browser interface device 206 may update a flag value, such as flag value 340, and/or timestamp, such as timestamp 336, associated with the selected URL, such as URL 330. In this way, process 600 may be utilized to re-assess one or more URLs previously identified as being accessible, and determine whether a third-party vendor associated with a third-party website filter device has updated one or more access rules associated with the URLs stored in the filtering database, such as database 204. In one example, process 600 continues iteratively by returning from block 610 or 612 to block 602.

Decision block 614 may represent one or more processes executed to determine whether the iterative filtering process 600 has re-assessed all of the stored URLs. If all of the stored URLs have been re-assessed, process 600 is completed, and proceeds to block 616. If, however, process 600 has not iterated through all the of stored URLs, process 600 proceeds back to block 602.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the art will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

Accordingly, it will be understood that the invention is not to be limited to the embodiments disclosed herein, but is to be understood from the following claims, which are to be interpreted as broadly as allowed under the law.

What is claimed is:

1. An apparatus comprising:
   a processor; and
   a non-transitory computer-readable medium comprising computer-executable instructions that when executed by the processor are configured to:
      receive, from a filtering database comprising a plurality of keyword strings, a selected keyword string;
      transmit the selected keyword string to an internet scraper device;
      receive, from the internet scraper device, web content comprising a plurality of uniform resource locators associated with the selected keyword string;
      store the plurality of uniform resource locators;
      iteratively attempt to access the plurality of uniform resource locators;
      determine, for each of the plurality of uniform resource locators, a status indicating whether a website associated with a respective uniform resource locator is accessible or blocked; and
      generate an output dataset associating each of the plurality of uniform resource locators with the determined status.

2. The apparatus of claim 1, wherein the non-transitory computer-readable medium comprises computer-executable instructions that when executed by the processor are further configured to:
   identify one or more additional keyword strings that appear in the web content at least a threshold number of times; and
   store the one or more additional keyword strings in the filtering database.

3. The apparatus of claim 1, wherein the non-transitory computer-readable medium comprises computer-executable instructions that when executed by the processor are further configured to:
   associate a timeout counter with the respective uniform resource locator; and
   upon expiration of the timeout counter, re-attempt to access the respective uniform resource locator.

4. The apparatus of claim 1, wherein the non-transitory computer-readable medium comprises computer-executable instructions that when executed by the processor are further configured to:
   modify a protocol of the respective uniform resource locator and re-attempt to access the modified respective uniform resource locator.

5. The apparatus of claim 1, wherein the internet scraper device is a search engine.

6. The apparatus of claim 1, wherein the selected keyword string is associated with a ranking in the filtering database.

7. The apparatus of claim 6, wherein the ranking is based on a number of attempts, by a plurality of users, to access one or more websites associated with the selected keyword string.

8. The apparatus of claim 1, wherein the non-transitory computer-readable medium comprises computer-executable instructions that, when executed by the processor, are further configured to:
   determine, based on comparing the generated output dataset to a stored generated output dataset, whether a third party filtering website has updated one or more filtering rules.

9. The apparatus of claim 8, wherein the non-transitory computer-readable medium comprises computer-executable instructions that when executed by the processor are further configured to:
   transmit the output dataset to the third party filtering website to update the one or more filtering rules.

10. A computer-implemented method, comprising:
    receiving, from a filtering database comprising a plurality of keyword strings, a selected keyword string;
    transmitting the selected keyword string to an internet scraper device;
    receiving, from the internet scraper device, web content comprising a plurality of uniform resource locators associated with the selected keyword string;
    storing the plurality of uniform resource locators;
    iteratively attempting to access the plurality of uniform resource locators,
    associating a first flag value with a selected uniform resource locator, from the plurality of uniform resource locators, if access is granted to a website associated with the selected uniform resource locator;
    associating a second flag value with the selected uniform resource locator if access is not granted to the website associated with the selected uniform resource locator; and
    generating an output dataset associating each of the plurality of uniform resource locators with the first flag value or the second flag value.

11. The computer-implemented method of claim 10, further comprising:
    identifying one or more additional uniform resource locators that appear in the web content at least a threshold number of times; and
    storing the one or more additional uniform resource locators.

12. The computer-implemented method of claim 10, further comprising:
    associating a timeout counter with the selected uniform resource locator; and
    re-attempting, upon expiration of the timeout counter, to access the selected uniform resource locator.

13. The computer-implemented method of claim 10, further comprising:
    modifying a protocol of the selected uniform resource locator; and
    re-attempting to access the modified selected uniform resource locator.

14. The computer-implemented method of claim 10, further comprising:
    determining, based on comparing the generated output dataset to a stored generated output dataset, whether a third party filtering website has updated one or more filtering rules.

15. The computer-implemented method of claim 14, further comprising:
    transmitting the output dataset to the third party filtering website to update one or more filtering rules.

16. One or more non-transitory computer-readable media having instructions stored thereon that, when executed, cause at least one computing device to:
    receive, from a filtering database comprising a plurality of keyword strings, a selected keyword string;

transmit the selected keyword string to an internet scraper device;

receive, from the internet scraper device, web content comprising a plurality of uniform resource locators associated with the selected keyword string;

store the plurality of uniform resource locators;

attempt to access the plurality of uniform resource locators;

determine, for each of the plurality of uniform resource locators, based on one or more features of a website associated with a respective uniform resource locator, a status indicating whether the website is accessible or blocked; and generate an output dataset associating each of the plurality of uniform resource locators with the status.

17. The one or more non-transitory computer-readable media of claim 16, wherein the instructions stored thereon, when executed, further cause at least one computing device to:

identify one or more additional keyword strings that appear in the web content at least a threshold number of times; and add the one or more additional keyword strings to the filtering database.

18. The one or more non-transitory computer-readable media of claim 16, wherein the instructions stored thereon, when executed, further cause at least one computing device to:

associate a timeout counter with the respective uniform resource locator; and upon expiration of the timeout counter, re-attempt to access the respective uniform resource locator.

19. The one or more non-transitory computer-readable media of claim 16, wherein the instructions stored thereon, when executed, further cause at least one computing device to:

determine, based on comparing the generated output dataset to a stored generated output dataset, whether a third party filtering website has updated one or more filtering rules.

20. The one or more non-transitory computer-readable media of claim 19, wherein the instructions stored thereon, when executed, further cause at least one computing device to:

transmit the output dataset to the third party filtering website to update the one or more filtering rules.

* * * * *